(12) United States Patent
Takayanagi et al.

(10) Patent No.: US 7,679,903 B2
(45) Date of Patent: Mar. 16, 2010

(54) DISPLAY DEVICE AND ELECTRONIC APPARATUS

(75) Inventors: Masaya Takayanagi, Kawasaki (JP); Masuo Ohnishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/081,413

(22) Filed: Apr. 15, 2008

(65) Prior Publication Data

US 2008/0259568 A1  Oct. 23, 2008

(30) Foreign Application Priority Data

Apr. 23, 2007  (JP) .............................. 2007-113090

(51) Int. Cl.
  *H05K 7/20* (2006.01)
  *G02F 1/133* (2006.01)
(52) U.S. Cl. .................. 361/679.54; 361/690; 361/704; 361/708; 349/161
(58) Field of Classification Search ............. 361/679.54
  See application file for complete search history.

(56) References Cited

U.S. PATENT DOCUMENTS

| | | | |
|---|---|---|---|
| 4,910,434 A * | 3/1990 | Doumani et al. ................ 315/3 |
| 5,606,341 A * | 2/1997 | Aguilera ....................... 345/87 |
| 6,330,148 B1 | 12/2001 | Won et al. | |
| 6,515,857 B2 * | 2/2003 | Ford et al. ............. 361/679.53 |
| 2001/0043461 A1 | 11/2001 | Hamano | |
| 2002/0163791 A1 | 11/2002 | Hoelen et al. | |
| 2002/0195923 A1 | 12/2002 | Won et al. | |
| 2004/0264130 A1* | 12/2004 | Liang .......................... 361/690 |
| 2005/0073639 A1* | 4/2005 | Pan ............................. 349/161 |
| 2005/0180142 A1 | 8/2005 | Tsai | |
| 2006/0203445 A1* | 9/2006 | Hsu et al. .................... 361/687 |
| 2006/0243948 A1* | 11/2006 | Ishiwa et al. ........... 252/299.61 |
| 2006/0262036 A1* | 11/2006 | Oh et al. ........................ 345/60 |
| 2006/0289830 A1* | 12/2006 | Cai et al. ............... 252/299.61 |
| 2007/0046851 A1 | 3/2007 | Fujita et al. | |

FOREIGN PATENT DOCUMENTS

| | | |
|---|---|---|
| JP | 8-262440 A | 10/1996 |
| JP | 2000-206900 A | 7/2000 |
| JP | 2001-249621 | 9/2001 |
| JP | 2003-029244 A | 1/2003 |
| JP | 2004-333670 A | 11/2004 |
| JP | 2004-361615 A | 12/2004 |
| JP | 2007-065158 A | 3/2007 |
| KR | 2005-56702 | 6/2005 |

OTHER PUBLICATIONS

Extended European Search Report issued Aug. 7, 2008 in corresponding European Patent Application No. 08154278.9.
Japanese Notice of Reasons for Rejection (A partial English-language translation is provided.)
Chinese Office Action (and English-language translation), mailed Aug. 7, 2009 from CN Patent Office for corresponding CN App. No. 200810091245.4.

* cited by examiner

*Primary Examiner*—Gregory D Thompson
(74) *Attorney, Agent, or Firm*—Fujitsu Patent Center (57) ABSTRACT

A display device includes: a frame that holds a display panel having a thin member and a light source that irradiates the display panel with light; and a cover that covers the frame. The display device further includes: a heat sink situated in the central portion in the width direction of the display panel in the frame and extending in and out of the frame; and a heat dissipation component provided in the cover and being in contact with the heat sink at a position outside the frame.

7 Claims, 10 Drawing Sheets

DISPLAY DEVICE AND ELECTRONIC APPARATUS

BACKGROUND OF THE INVENTION

1. Field of the Invention

The present invention relates to a display device that displays image, and an electronic apparatus including the same.

2. Description of the Related Art

Conventionally, a portable image display device for displaying image has used a liquid crystal module having a liquid crystal panel.

Further, some of liquid crystal modules have employed a system, a so-called "edge light" that includes, on the back side of a liquid crystal panel, a member called "light guiding plate" for directing light from a light source received on a side face from a front face toward the liquid crystal panel.

The liquid crystal module of the edge light system includes: a liquid crystal panel; a light irradiation section that includes a cold cathode tube or the light guiding plate described above as a light source that irradiates the liquid crystal panel with light; a frame that integrally holds the liquid crystal panel and the light irradiation section; and a control substrate on which an inverter for supplying power to the light source is implemented.

The liquid crystal module of the edge light system, recently, has been also increasingly required to be more lightweight and thinner, and to have a longer service life, and some approaches considering these requirements have been proposed (see, for example, Japanese Patent Application Publication No. 2001-249621).

Recently, a light emitting diode (LED) has been used as a light source because it allows a system to be made more lightweight and thinner than a system employing a cold cathode tube.

However, an LED has problems of poor resistance to heat and a short service life when exposed to heat.

In addition, the problems described above are not limited to a liquid crystal panel but lie in a display panel requiring light irradiation from a light source for displaying image, and also will arise not only in the LED, but in a light source that can be made more lightweight and thinner, but has poor resistance to heat.

SUMMARY OF THE INVENTION

The present invention has been made in view of the above circumstances and provides a display device that can be made more lightweight and thinner, and concurrently have a longer service life, and an electronic apparatus including the display device.

A display device according to the present invention has a frame that holds a display panel having a thin member and a light source that irradiates the display panel with light, and a cover that covers the frame, the display device including:

a heat sink disposed in a central portion of a side of the frame extending in a width direction of the display panel, the heat sink extending in and out of the frame; and a heat dissipation component provided in the cover and being in contact with the heat sink at a position outside the frame.

In the display device of the present invention, heat generated by the light source is transferred from the frame that holds the light source to the heat sink, and further from the heat sink to the cover through the heat dissipation component. Accordingly, the display device of the present invention allows the light source not to be exposed to heat and can contribute to prolonging a service life of the light source.

Preferably, the display device according to the present invention further includes a second heat dissipation component provided in the cover and being in contact with an end portion of the side of the frame extending in the width direction of the display panel.

Contact of a second heat dissipation component with an end portion of the frame can more accelerate heat transfer from the frame to the cover.

In the display device according to the present invention, the cover may include a front cover and a back cover that accommodate the frame, and the heat dissipation component may be provided in the back cover.

Preferably, the display device according to the present invention further includes a reinforcing component provided between the cover and the heat dissipation component.

The reinforcing component provided in the cover can suppress occurrence of severe bending in a portion of the cover to which pressure is applied even when the cover partially undergoes the pressure, and the frame and the display panel in the cover can be prevented from being damaged. Also, the reinforcing component is made, for example, of metal, and heat transfer from the frame to the cover can be more accelerated.

It is further preferable that in the display device according to the present invention, the reinforcing component includes:

a first portion extending in a direction parallel to a surface of the cover, and a second portion extending in a direction perpendicular to the first portion.

When the reinforcing component includes the first portion and the second portion extending in a direction perpendicular to the first portion, the reinforcing component is more strengthened, which can surely protect the frame and the display panel from a partial pressure applied to the cover.

In the display device according to the present invention, it is preferable that the heat dissipation component is made of heat dissipation rubber.

If the heat dissipation component is made of heat dissipation rubber, it is possible to protect the display panel from an impact applied to the cover.

An electronic apparatus according to the present invention includes:

the display device according to claim 1, and a main device openably and closably connected to the display device with a hinge.

According to the present invention described above, it is possible to provide a display device that can be made more lightweight and thinner, and concurrently have a longer service life, and an electronic apparatus including the display device.

DETAILED DESCRIPTION OF THE INVENTION

Now, embodiments of the present invention will be described.

Figure 1:
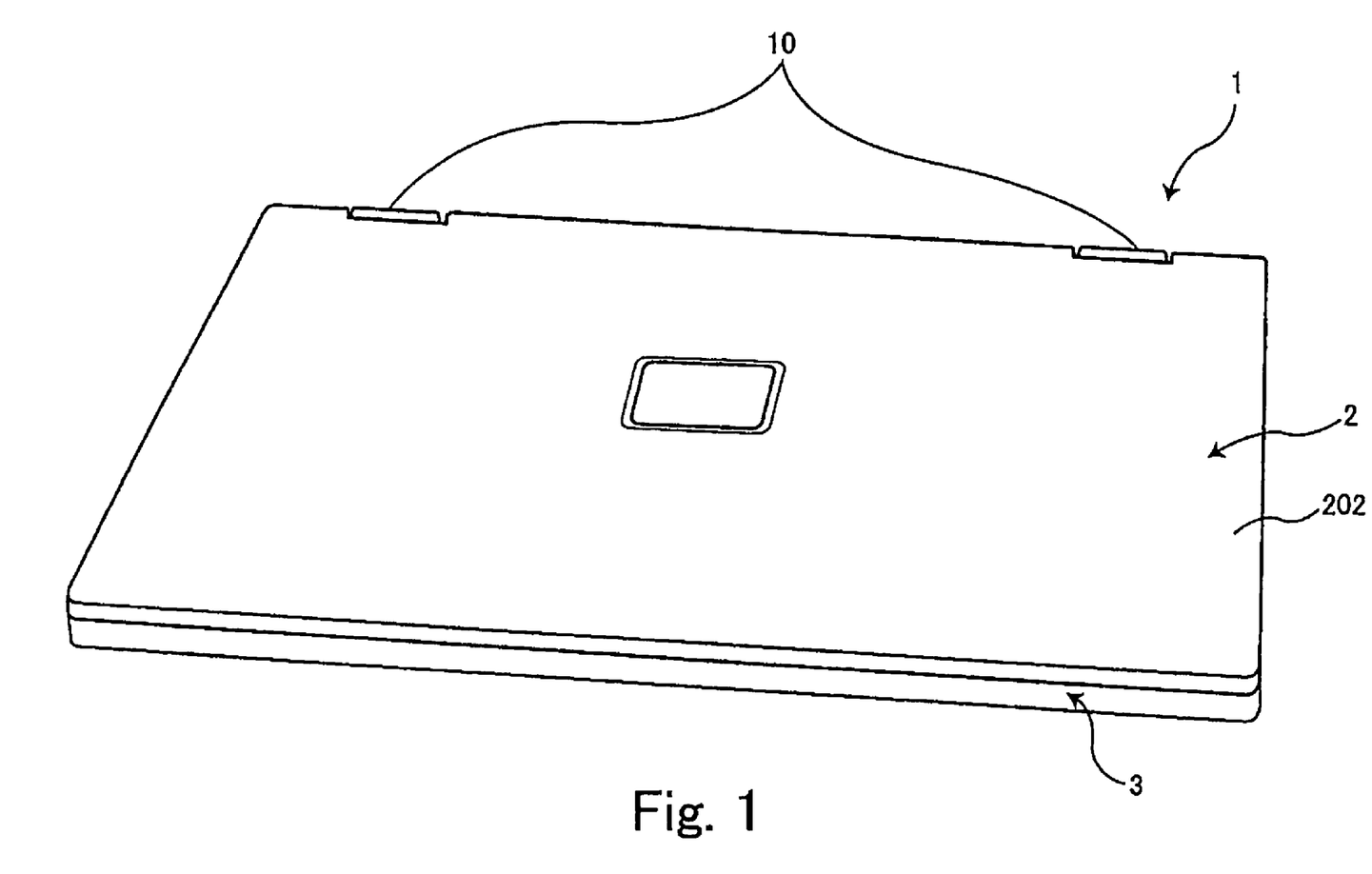
FIG. 1 is an outline view of one embodiment of an electronic apparatus of the present invention including one embodiment of a display device of the present invention.
Figure 2:
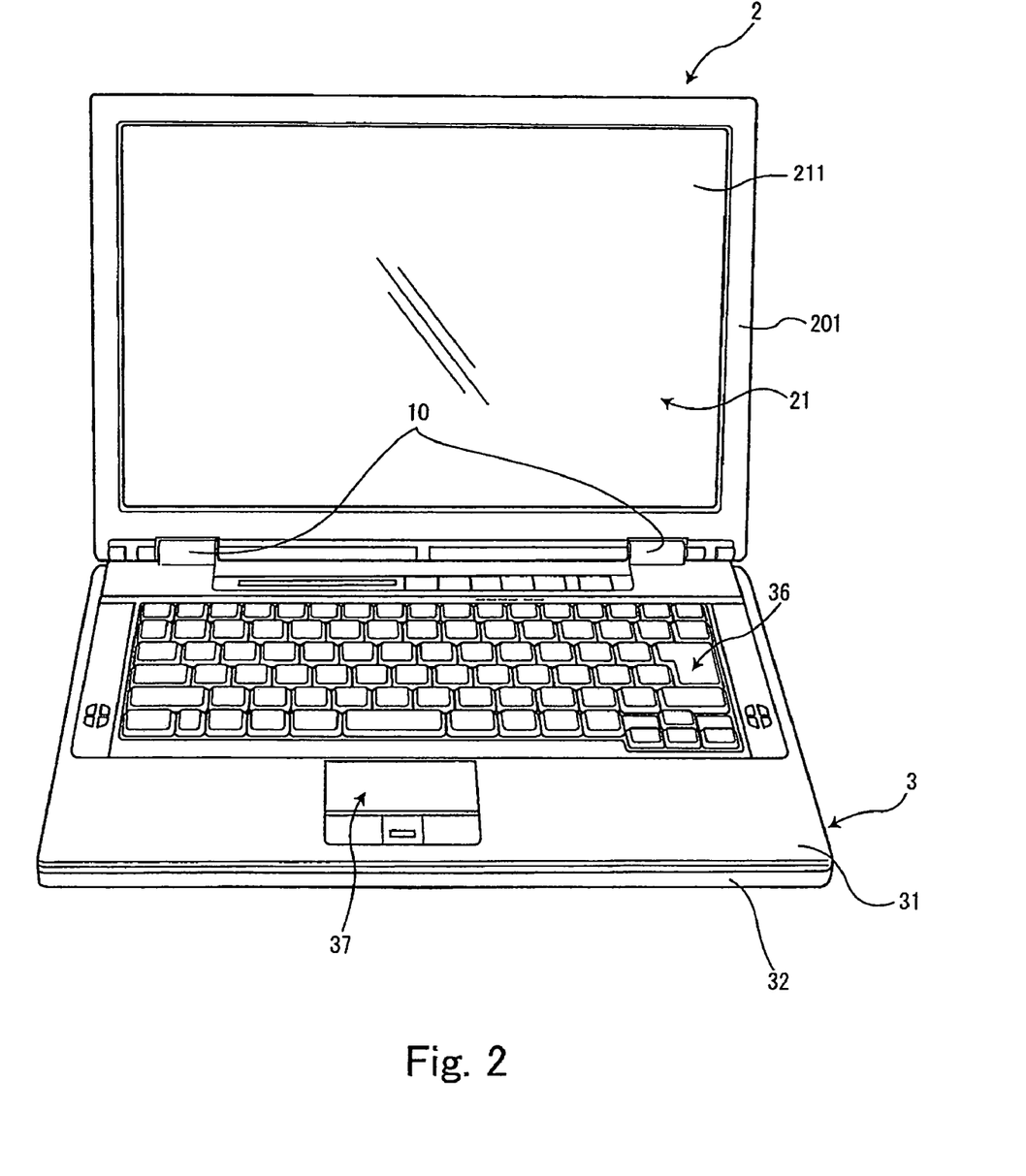
FIG. 2 is another outline view of the one embodiment of the electronic apparatus of the present invention including one embodiment of the display device of the present invention.

FIGS. 1 and 2 are outline views of one embodiment of an electronic apparatus of the present invention including one embodiment of a display device of the present invention.

A computer 1 of one embodiment of the electronic apparatus of the present invention is a so-called "Notebook PC" in which an image display device 2 (one embodiment of the display device of the present invention) having a liquid crystal panel 21 for displaying image and a main device 3 having a circuit board therein and a keyboard arranged on an upper surface thereof are openably and closably linked to each other through a hinge member 10.

FIG. 1 shows that the image display device 2 is closed and overlaid on the main device 3, and FIG. 2 shows that the image display device 2 is opened with respect to the main device 3.

The main device 3 shown in FIG. 2 includes: a keyboard 36 in which multiple keys are arranged; an operation section 37 including a track pad and click buttons; an upper cover 31 molded so as to keep away from a portion into which the keyboard 36 and the operation section 37 are fitted; a lower cover 32 for forming a housing of the main device 3 along with the upper cover 31; and the circuit board contained in the housing, on which a CPU executing a program is installed.

Further, the image display device 2 shown in FIG. 2 includes: a liquid crystal module including the liquid crystal panel 21 for displaying image; a front cover 201 for covering the circumference of the liquid crystal panel 21; and a back cover 202 (see FIG. 1) for accommodating the liquid crystal module and forming a housing of the image display device 2 along with the front cover 201. In addition, in the computer 1, the covers for forming the housings are made of resin.

The liquid crystal module includes: the liquid crystal panel 21; a light irradiation section for irradiating the liquid crystal panel 21 with light and including an LED as a light source; a metal frame for integrally holding the liquid crystal panel 21 and the light irradiation section; and a control board on which the circuit board for controlling emission of the LED is implemented.

The liquid crystal panel 21 is generally formed by laminating a polarizing filter (vertical) 211 (see FIG. 3), a glass plate, liquid crystal sandwiched by transparent electrodes, a glass plate and a polarizing filter (horizontal) in this order from the front face side.

The light irradiation section includes: an LED; a light guiding plate situated on the back side of the liquid crystal panel 21; and a reflecting plate situated on the reverse face side of the light guiding plate, for receiving irradiated light from the LED by a side face and reflecting it to the front face side. In addition, the liquid crystal module 20 is of a type of the so-called "edge light system".

Now, a structure of the image display device 2 will be described in detail.

Figure 3:
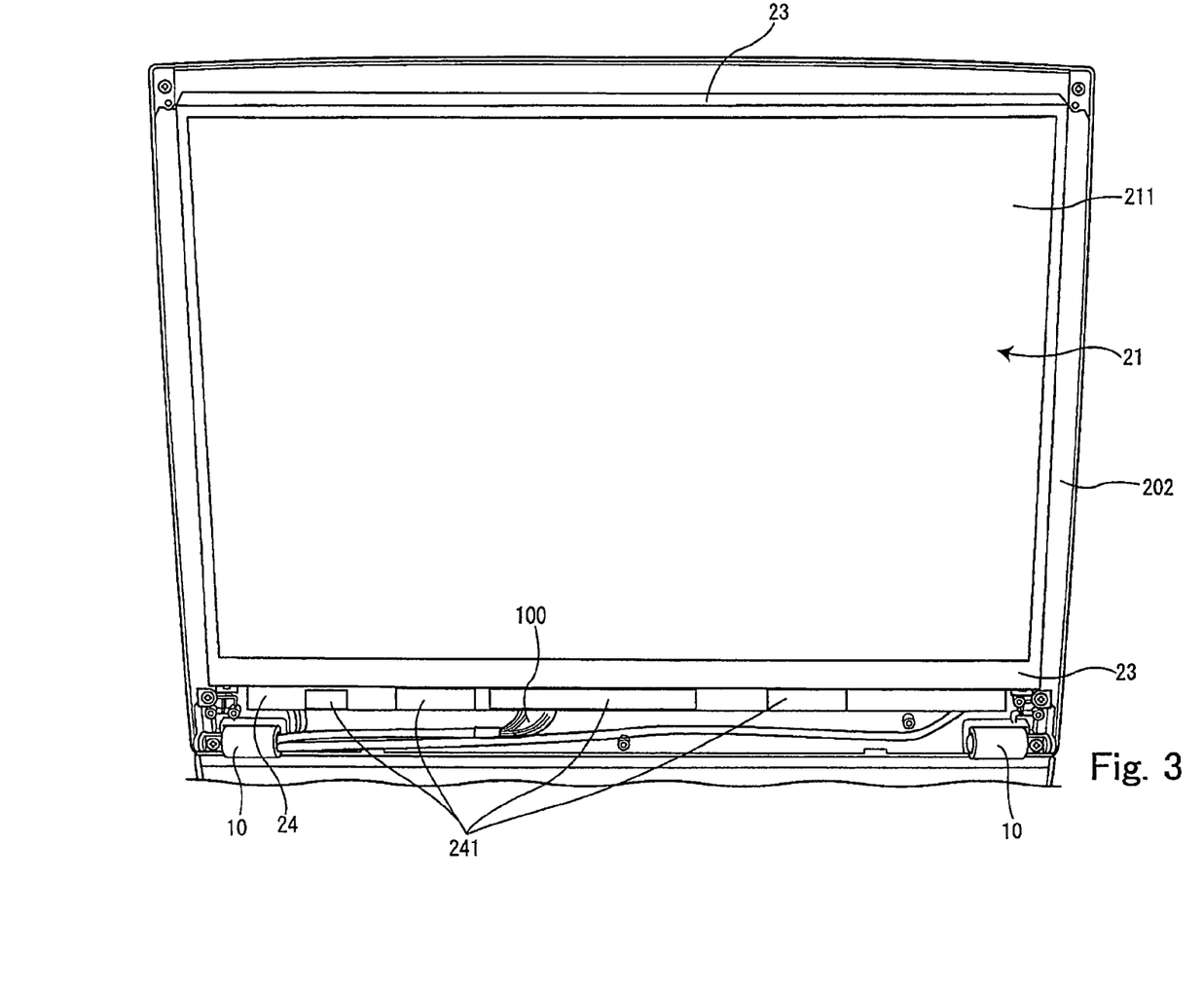
FIG. 3 shows an image display device whose front cover is removed.

FIG. 3 shows the image display device whose front cover is removed.

FIG. 3 shows the image display device 2 when the front cover 201 is removed that covers both of a rim portion of the polarizing filter 211 situated in the front of the liquid crystal panel 21 and a metal frame 23 for integrally holding the liquid crystal panel 21 and the light irradiation section.

Further, FIG. 3 shows that a cable 100 is connected to a control board 24 on which a circuit board 241 is implemented, and which composes the liquid crystal module together with other elements such as the liquid crystal panel 21 and the metal frame 23. In addition, a miniature camera unit, a microphone unit and further, wiring attached thereto and the like are actually arranged around the liquid crystal module, but are not shown in FIG. 3.

Figure 4:
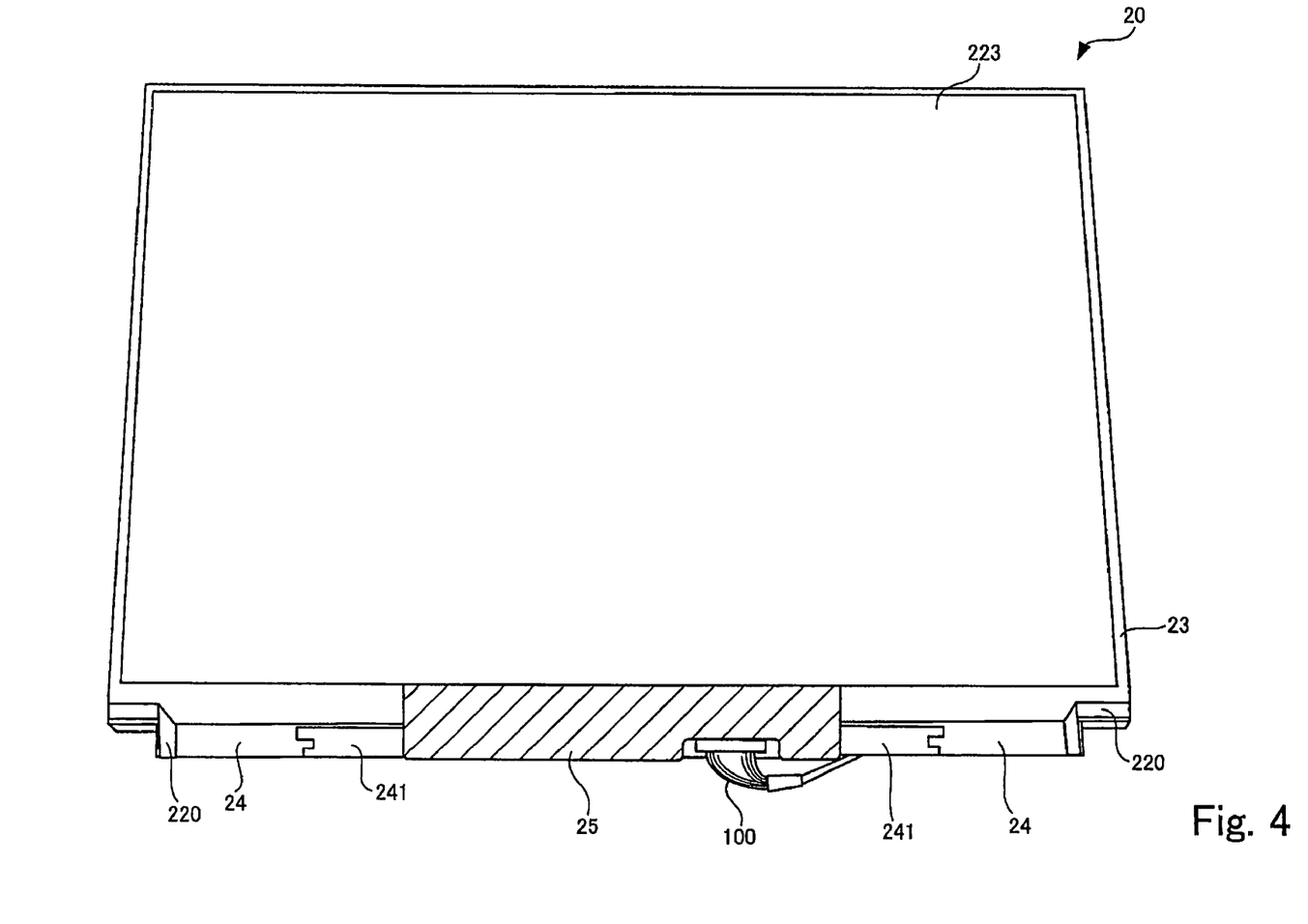
FIG. 4 is a back view of a liquid crystal module.

FIG. 4 is a back view of the liquid crystal module.

FIG. 4 shows the liquid crystal module 20 seen from the backside while FIG. 3 showing the liquid crystal module 20 seen from the front side. In addition, FIG. 4 shows a reflecting plate 223 situated at the rearmost position among the components of the light irradiation section situated on the backside of the liquid crystal panel 21.

FIG. 4 also shows that a flexible cable 220 extends from each of both ends of the metal frame 23 lying below in FIG. 4. In addition, the flexible cable 220 has an LED 221 (see FIG. 6) installed thereon, and actually, the flexible cable 220 runs inside the metal frame 23 and is connected to the control board 24.

Further, FIG. 4 shows that a heat dissipation plate 25 indicated by slanted lines is attached to a lower, central portion of the metal frame 23 in FIG. 4. Incidentally, the heat dissipation plate 25 corresponds to one example of the heat sink according to the present invention.

Figure 5:
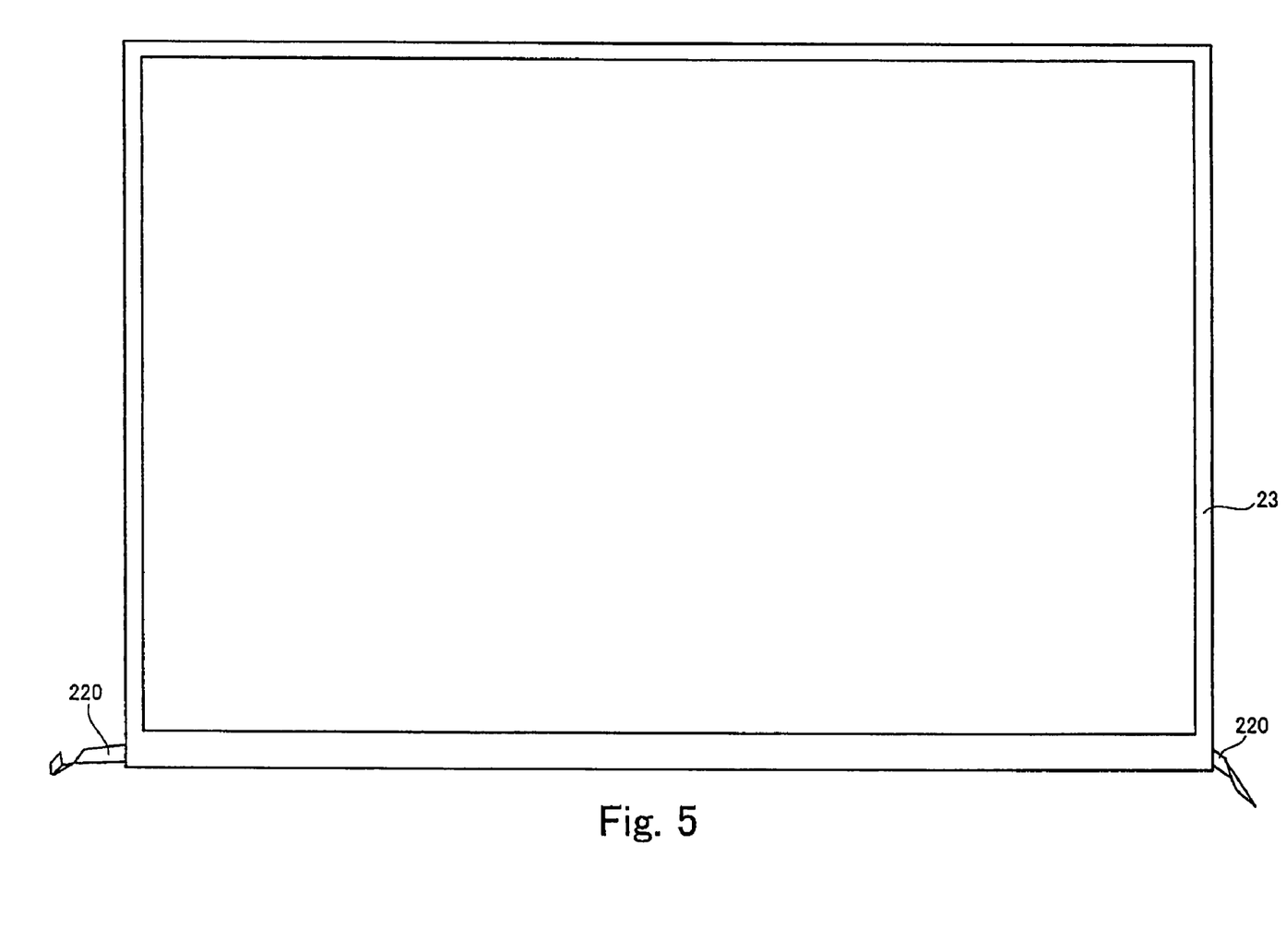
FIG. 5 shows a metal frame.

FIG. 5 shows the metal frame.

FIG. 5 shows the metal frame 23 in the liquid crystal module 20 whose back side is shown in FIG. 4, and here, shows also the flexible cables 220 extending from right-and-left lower ends of the metal frame 23.

Figure 6:
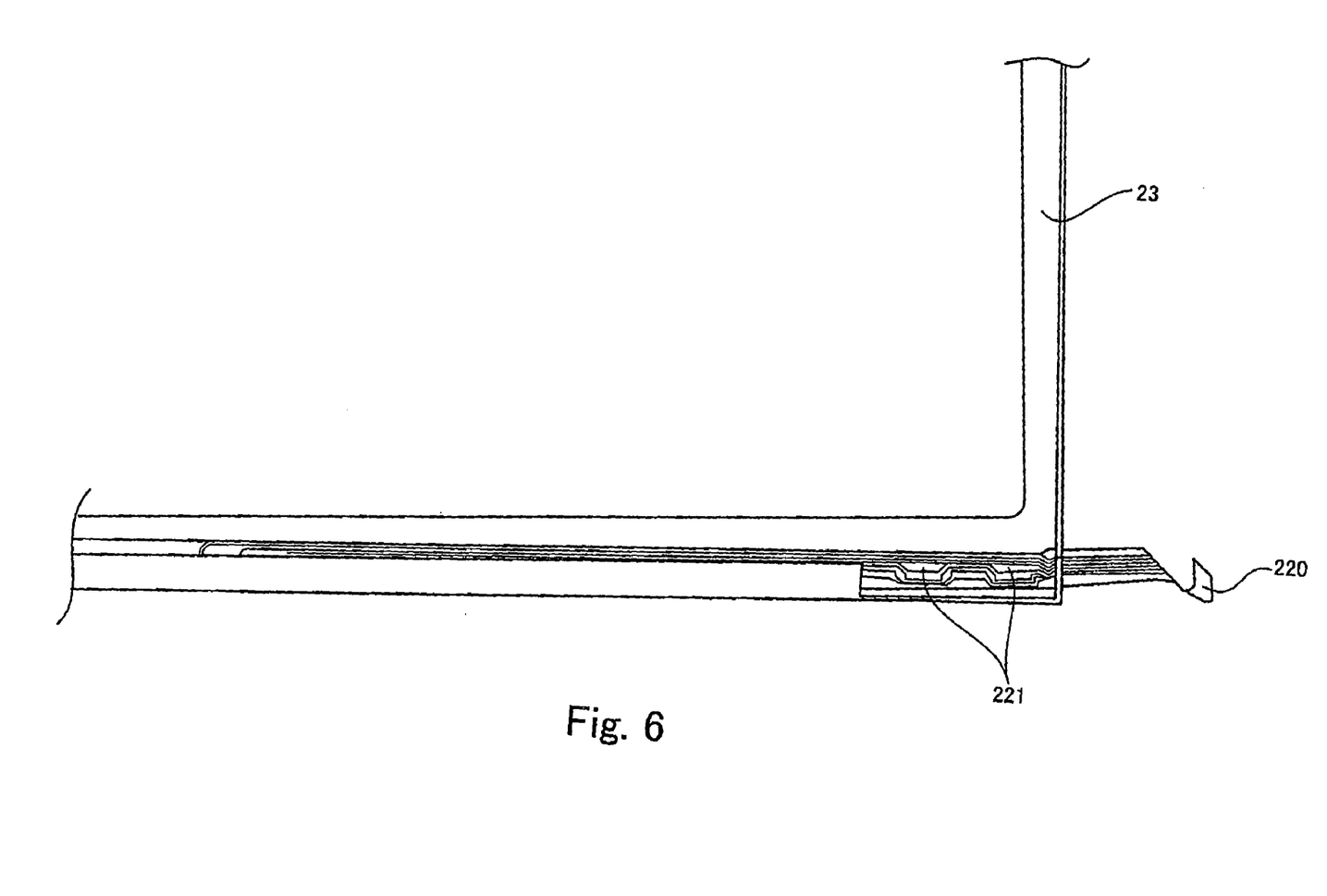
FIG. 6 is an elevation view of the metal frame.

FIG. 6 is an elevation view of the metal frame.

FIG. 6 shows the metal frame 23 seen from the front side while FIG. 5 showing the metal frame 23 seen from the back side, and here, shows a part of multiple LEDs 221 installed on the flexible cable 220 running inside the metal frame 23.

Figure 7:
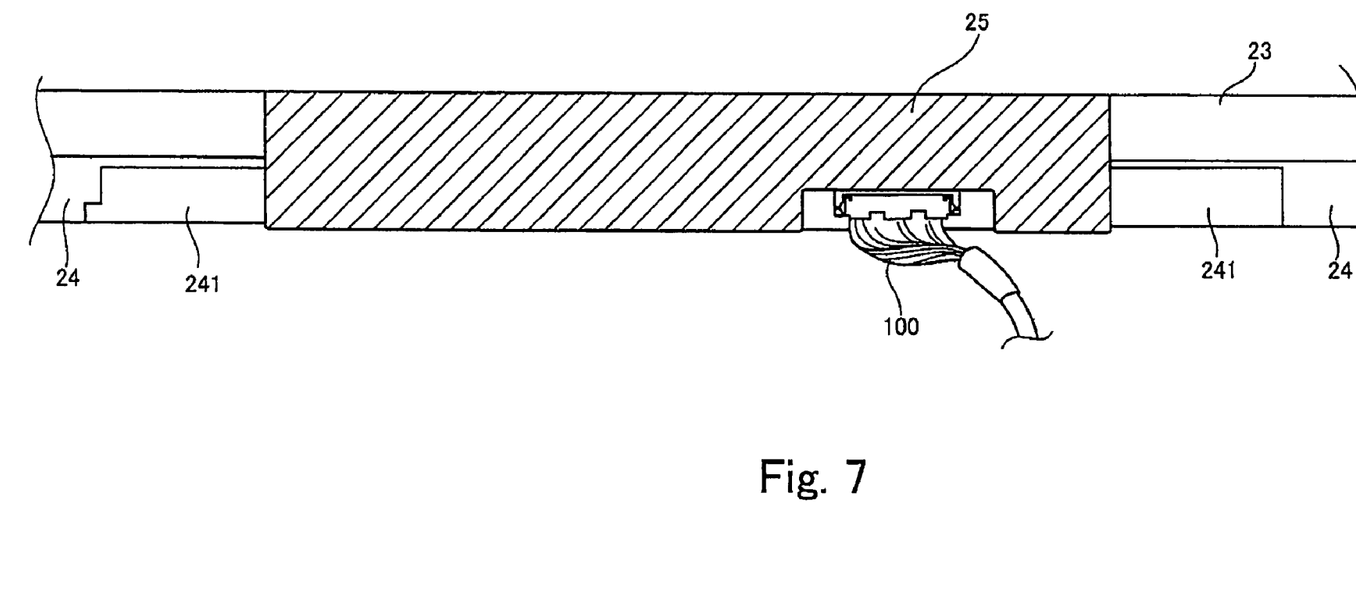
FIG. 7 is an enlarged view of a heat dissipation plate.

FIG. 7 is an enlarged view of the heat dissipation plate.

FIG. 7 shows, in the enlarged view, the heat dissipation plate 25 in the liquid crystal module 20 whose back face is shown in FIG. 4, and only an upper half of the heat dissipation plate 25 shown in FIG. 7 is attached to the metal frame 23.

Figure 8:
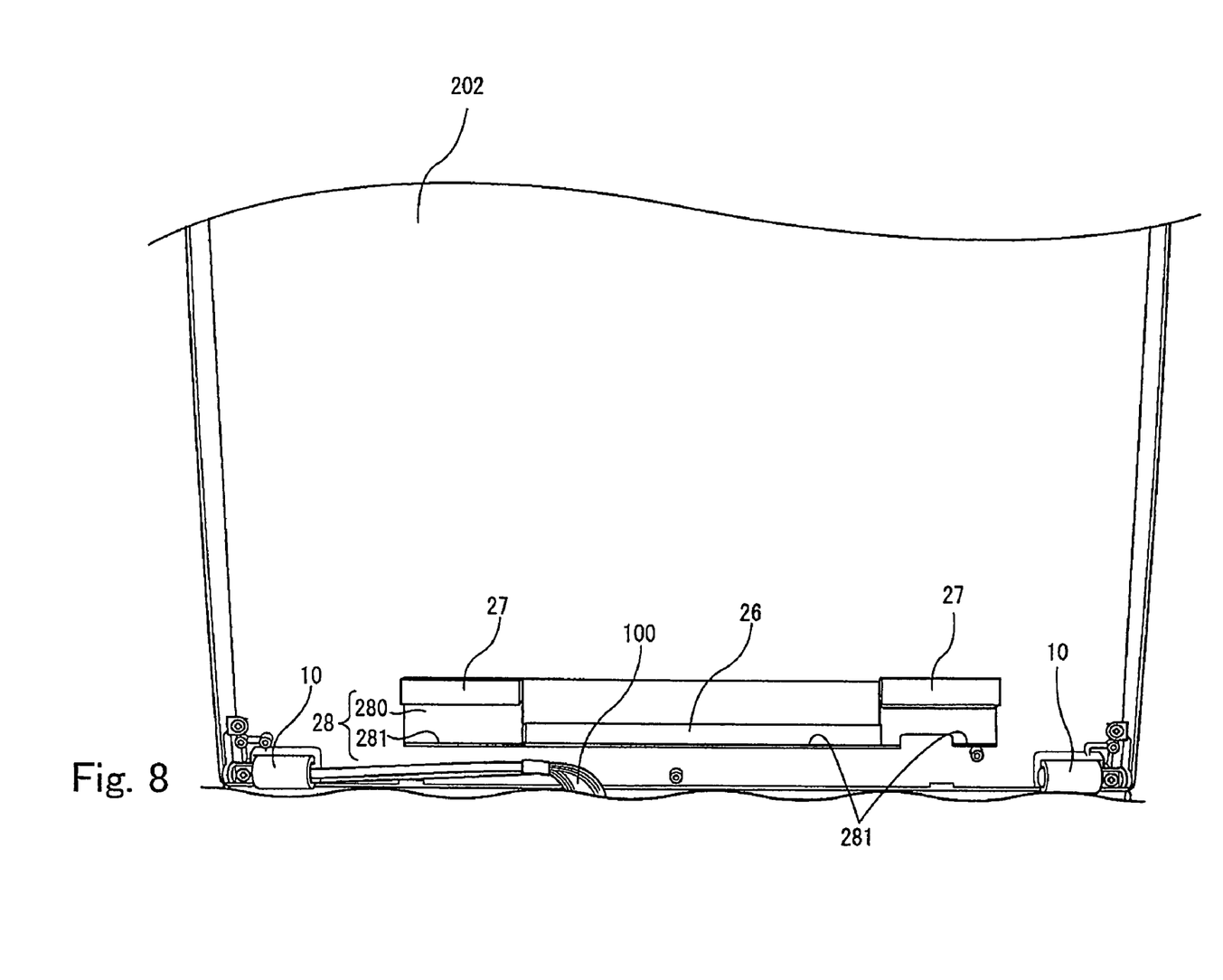
FIG. 8 shows the inside of a back cover.

FIG. 8 shows the inside of the back cover.

FIG. 8 shows a state in that the liquid crystal module 20 is removed from the state shown in FIG. 3, and here, shows that the inside of the back cover 202 is exposed.

Further, FIG. 8 shows that a first heat dissipation rubber 26 is arranged at a position where the first heat dissipation rubber 26 is in contact with the heat dissipation plate 25 shown in FIG. 4 and attached to the metal frame 23 of the liquid crystal module 20. The first heat dissipation rubber 26 has a width in contact with a portion where the heat dissipation plate 25 protrudes from the metal frame 23, and has the same length as that in the longitudinal direction of the heat dissipation plate 25. Incidentally, the first heat dissipation rubber 26 corresponds to one example of the heat dissipation component according to the present invention.

Generally, due to light irradiation from the back face of the liquid crystal panel, heat generated from the LED held inside the metal frame along with the liquid crystal panel tends to persist inside the metal frame, and the persisting heat may cause a product life of the LED to be shortened. Then, in the computer 1 of the present embodiment, the heat dissipation plate 25 is attached to the metal frame 23. Accordingly, heat in the metal frame 23 is at least conducted to the heat dissipation plate 25, and heat can be dissipated from the metal frame 23.

Further, in the computer 1 of the present embodiment, the first heat dissipation rubber 26 in contact with a portion except for the portion where the heat dissipation plate 25 is attached to the metal frame 23 is provided on the back cover 202 side. Accordingly, heat generated from the LED 221 can be more dissipated through the metal frame 23. As described above, the first heat dissipation rubber 26 is provided to keep away from the portion where the heat dissipation plate 25 is attached to the metal frame 23. This is because, if the heat dissipation rubber 26 is provided to include the portion of the metal frame 23 to which the heat dissipation plate 25 is attached, the liquid crystal panel 21 held in the central portion of the metal frame 23 may be easily damaged when pressure is applied to the back cover 202 of the image display device 2, and the present inventors have taken such measures based on the experimental results.

Further, FIG. 8 shows second heat dissipation rubbers 27 provided in a different step from the first heat dissipation rubber 26 so as to be in contact with the metal frame 23 on both sides of the first heat dissipation rubber 26. Incidentally, the second heat dissipation rubber 27 corresponds to one example of the second heat dissipation component according to the present invention.

In the computer 1 of the present embodiment, when the liquid crystal module 20 is accommodated in the back cover 202, the metal frame 23 is in contact with the second heat dissipation rubbers 27, and accordingly, heat in the metal frame 23 is conducted to the first heat dissipation rubber 26 through the heat dissipation plate 25, and the second heat dissipation rubbers 27 also prevent the heat in the metal frame 23 from persisting therein.

Further, FIG. 8 shows a reinforcing plate 28 onto which upper surface the first heat dissipation rubber 26 and the second heat dissipation rubbers 27 are attached, and whose lower surface is fixed to the back cover 202.

The reinforcing plate 28 is a metal, L-shaped plate including a fixed section 280 fixed to the back cover 202 and a rising section 281 rising from the fixed section 280. The reinforcing plate 28 is used to prevent the liquid crystal panel 21 from being damaged due to bending of the back cover 202 caused by a local pressure applied to the back cover 202.

In the computer 1 of the present embodiment, the first heat dissipation rubber 26 and the second heat dissipation rubbers 27 are attached to the reinforcing plate 28 made of metal, and heat in the metal frame 23 is conducted up to the reinforcing plate 28. This also prevents the heat in the metal frame 23 from persisting therein.

In addition, the embodiment described above has been described referring to the example in which the back cover has had rubber for heat dissipation provided thereon, but any material except for the rubber may be used if it has performance of heat dissipation. Also, the description has been provided referring to the example in which the reinforcing plate has been the L-shaped plate, but the shape thereof may be an inverse T-shaped if the reinforcing plate includes a first portion extending in a direction parallel to the surface of the back cover and a second portion extending in a direction perpendicular to the first portion. Further, there has been described the example in which the metal frame 23 and the heat dissipation plate 25 have been separate components, but these may be integrally formed.

Now, modifications of the present embodiment will be hereinafter described.

Figure 9:
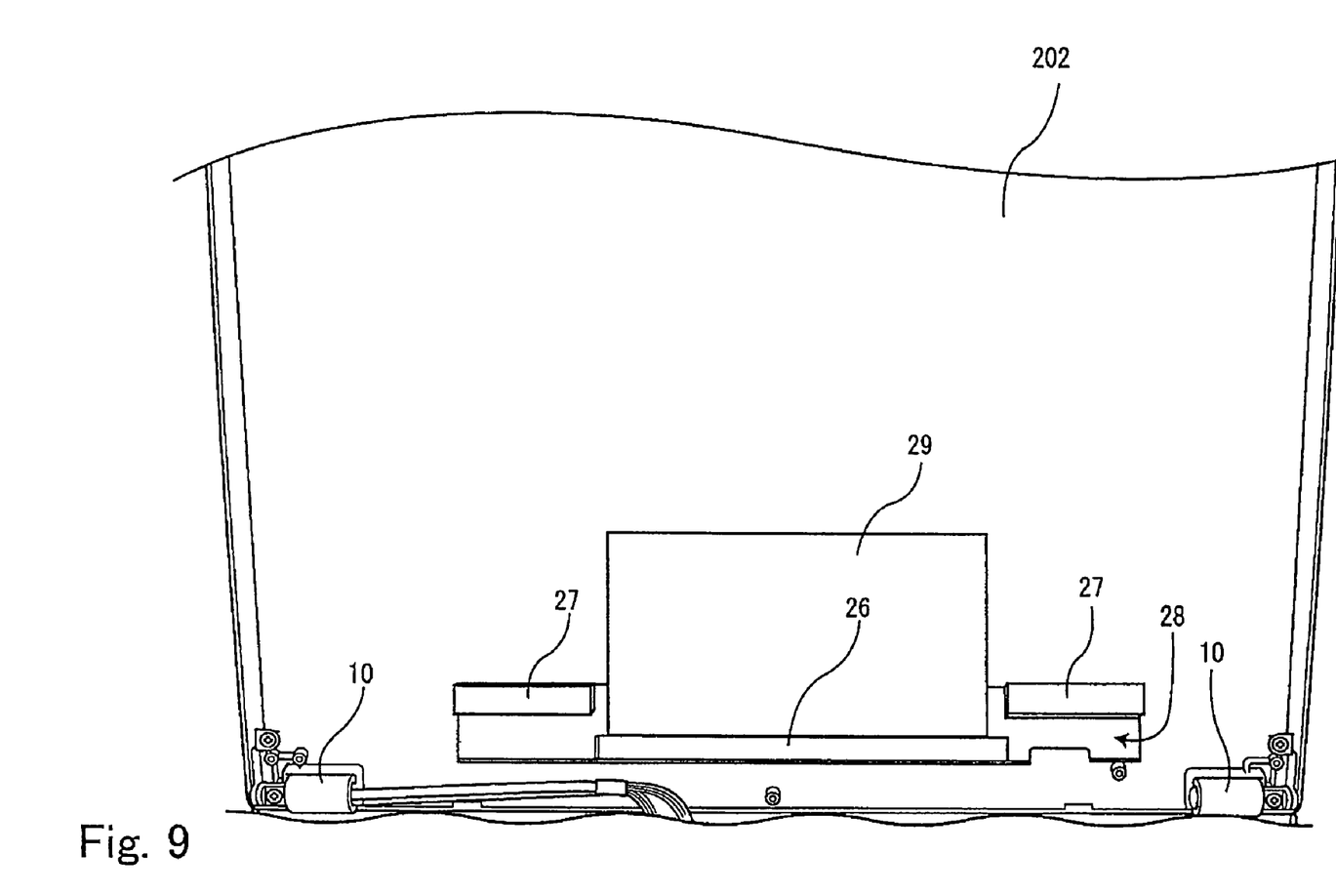
FIG. 9 shows an aspect in which a highly heat-transferable sheet is attached onto a reinforcing plate.

FIG. 9 shows a modification in which a highly heat-transferable sheet is attached onto the reinforcing plate.

FIG. 9 shows that the highly heat-transferable sheet 29 is attached onto the reinforcing plate 28 to prevent the heat in the metal frame 23 from persisting therein, in contrast with the example shown in FIG. 8. In such a manner, compared to the previously described example, the heat in the metal frame 23 can be further prevented from persisting therein.

Figure 10:
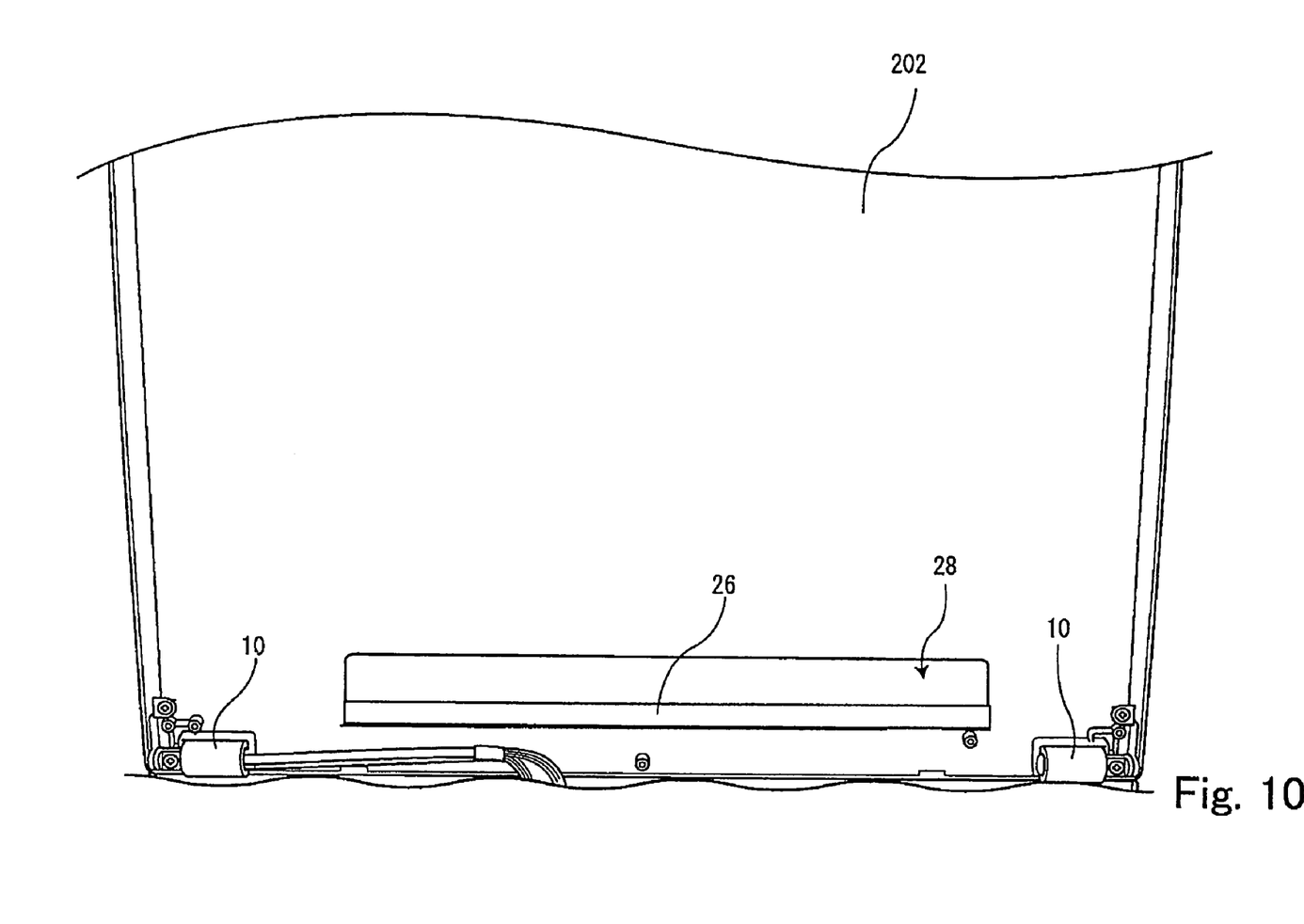
FIG. 10 shows an aspect in which a length of the heat dissipation plate according to the present embodiment is extended.

FIG. 10 shows another modification in which a length of the heat dissipation plate according to the present embodiment is extended.

FIG. 10 shows that when the length of the heat dissipation plate 25 shown in FIG. 7 is extended, and the lengths of the first heat dissipation rubber 26 and the reinforcing plate 28 are also extended according to the extended length of the heat dissipation plate 25. As compared to the example shown in FIG. 7, the heat in the metal frame 23 can be also further prevented from persisting therein.

What is claimed is:

1. A display device comprising:
   a frame that holds a display panel having a thin member and a light source that irradiates the display panel with light;
   a cover that covers the frame;
   a heat sink disposed in a central portion of a side of the frame extending in a width direction of the display panel, the heat sink extending in and out of the frame; and
   a heat dissipation component provided in the cover and being in contact with the heat sink at a position outside the frame.

2. The display device according to claim 1, wherein the heat dissipation component is a first heat dissipation component, and the display device further comprises a second heat dissipation component provided in the cover and being in contact with the frame at a position next to the first heat dissipation component.

3. The display device according to claim 1, wherein the cover includes a front cover and a back cover that accommodate the frame, and
   the heat dissipation component is provided in the back cover.

4. The display device according to claim 1, further comprising a reinforcing component provided between the cover and the heat dissipation component and including a fixed section fixed to the cover and a rising section rising from the fixed section in a direction toward the display panel.

5. The display device according to claim 4, wherein the reinforcing component includes:
   a first portion extending in a direction parallel to a surface of the cover, and
   a second portion extending in a direction perpendicular to the first portion.

6. The display device according to claim 1, wherein the heat dissipation component is made of heat dissipation rubber.

7. An electronic apparatus comprising:
a display device including
- a frame that holds a display panel having a thin member and a light source that irradiates the display panel with light,
- a cover that covers the frame,
- a heat sink disposed in a central portion of a side of the frame extending in a width direction of the display panel, the heat sink extending in and out of the frame, and
- a heat dissipation component provided in the cover and being in contact with the heat sink at a position outside the frame; and a main device openably and closably connected to the display device with a hinge.

* * * * *